United States Patent [19]

Jaynes

[11] Patent Number: 5,743,645
[45] Date of Patent: Apr. 28, 1998

[54] TIRE PYROMETER

[75] Inventor: Harry M. Jaynes, Redmond, Wash.

[73] Assignee: Longacre Automotive Racing Products, Redmond, Wash.

[21] Appl. No.: 661,969

[22] Filed: Jun. 12, 1996

[51] Int. Cl.$^6$ .............. G01K 13/00; G01K 3/06; G01K 1/02
[52] U.S. Cl. .............. 374/137; 374/141; 374/153; 374/115
[58] Field of Search .............. 374/141, 137, 374/166, 115, 116, 153

[56] References Cited

U.S. PATENT DOCUMENTS

| | | | |
|---|---|---|---|
| 3,978,325 | 8/1976 | Goldstein et al. | 235/151.3 |
| 4,483,631 | 11/1984 | Kydd | 374/141 |
| 4,618,268 | 10/1986 | Horner | 374/116 |
| 4,634,294 | 1/1987 | Christol et al. | 374/124 |
| 4,636,093 | 1/1987 | Nagasaka et al. | 374/124 |
| 4,673,298 | 6/1987 | Hunter et al. | 374/122 |
| 4,877,333 | 10/1989 | Ota et al. | 374/169 |
| 4,878,226 | 10/1989 | McQuoid et al. | 374/166 |
| 5,038,303 | 8/1991 | Kimura | 364/557 |

FOREIGN PATENT DOCUMENTS

| | | | |
|---|---|---|---|
| 0135925 | 8/1983 | Japan | 374/115 |
| 0008724 | 1/1985 | Japan | 374/141 |
| 0297728 | 12/1987 | Japan | 374/137 |
| 0015135 | 1/1988 | Japan | 374/137 |

*Primary Examiner*—Diego F. F. Gutierrez
*Attorney, Agent, or Firm*—Glenn D. Bellamy; David C. Campbell

[57] ABSTRACT

A tire pyrometer including a control box (12) and a tire probe (14), wherein the control box (12) includes a display panel (18) that can display up to twelve tire temperature readings at the same time. Display panel (18) can also display average temperatures for various temperature combinations of temperatures taken by tire probe (14).

14 Claims, 11 Drawing Sheets

EXAMPLE #1    AVG: LF 146        175 RF
                   LR 174        206 RR

EXAMPLE #2    FRONT AVG 160
              REAR AVG 190   +30

EXAMPLE #3    LEFT AVG 160
              RIGHT AVG 190  +30

EXAMPLE #4    CROSS AVG LR & RF 174
              CROSS AVG RR & LF 176 +2

EXAMPLE #5    179 167 158   209 184 178
              195 192 189   226 201 198

Fig 2

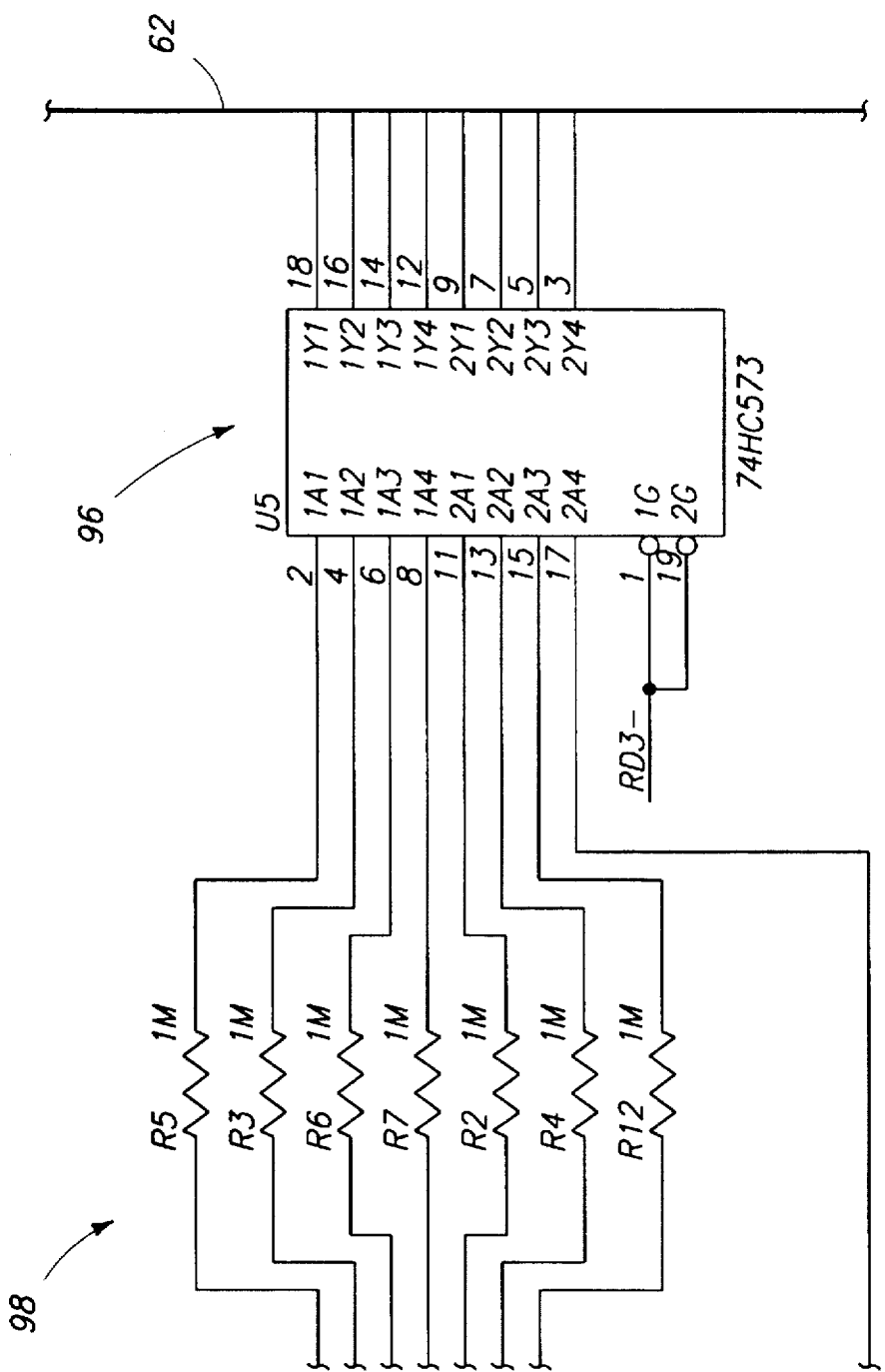

TIRE PYROMETER

TECHNICAL FIELD

The present invention pertains to tire pyrometers, and more particularly, to a tire pyrometer and control box for measuring tire temperatures of race cars.

BACKGROUND OF THE INVENTION

In the racing industry, information on the tire temperatures of a race car is helpful in tuning and adjusting the suspension of the race car to achieve maximum performance. Typically, race technicians use a tire pyrometer attached to a control box or readout gauge. The tire probe includes a needle and is sometimes referred to as a needle probe. The needle probe is inserted into the tire tread and the tire's temperature is displayed in a display panel of the control box or on the readout gauge. With information on the temperature of all four tires, a race technician can better tune the car's suspension for optimum performance. The description herein of the present invention assumes that one has knowledge and/or experience in tuning a vehicle's suspension in response to tire temperature information.

In many racing applications, tire probes are used to read the temperature of each tire at three locations: a center location, an inside edge location, and an outside edge location. With three temperature readings for each tire, a race technician has a better idea of how the race car is handling and how well the suspension is tuned to set the race car for maximum performance.

Some prior art tire pyrometers have a display panel on a control box that shows the current temperature sensed by the tire probe. Other tire pyrometers can also store a plurality of temperature readings in a memory device and recall these readings one at a time, when necessary. The present invention is an improvement over these types of prior art tire pyrometers.

SUMMARY OF INVENTION

Briefly described, the present invention comprises a computerized pyrometer for measuring tire temperatures of a vehicle having four tires. The tire pyrometer of the present invention includes a temperature probe for measuring a tire temperature, and a control box having electronic circuitry to receive a temperature reading from the temperature probe and display a numerical valve representative of the temperature. The control box includes a display panel capable of displaying twelve temperature readings at the same time. The temperature readings correspond to an inside temperature, center temperature, and outside temperature for each tire.

According to an aspect of the invention, the computerized pyrometer's control box includes a plurality of memory buttons and electronic circuitry for storing in memory all temperature readings simultaneously displayed on the display panel.

According to another aspect of the invention, the computerized pyrometer's control box includes electronic circuitry for averaging various combinations of temperature readings. For example, the control box's electronic circuitry averages the three temperature readings for each tire to produce a left front average, right front average, left rear average, and right rear average.

Also, the average temperature combinations include front average and rear average, left average and right average, and cross averages for left rear, right front average and right rear, left front average.

These and other features and advantages of the invention will become apparent from the following detailed description of the best mode and accompanying drawings, and the claims, which are all incorporated herein as part of the summary of the invention.

BRIEF DESCRIPTION OF THE DRAWINGS

Like reference numerals are used to indicate like parts throughout the various figures of the drawing, wherein:

FIG. 2 is a schematic drawing showing a variety of different display information that can be displayed on the control box of the tire pyrometer of FIG. 1.

BEST MODE FOR CARRYING OUT THE INVENTION

Figure 1:
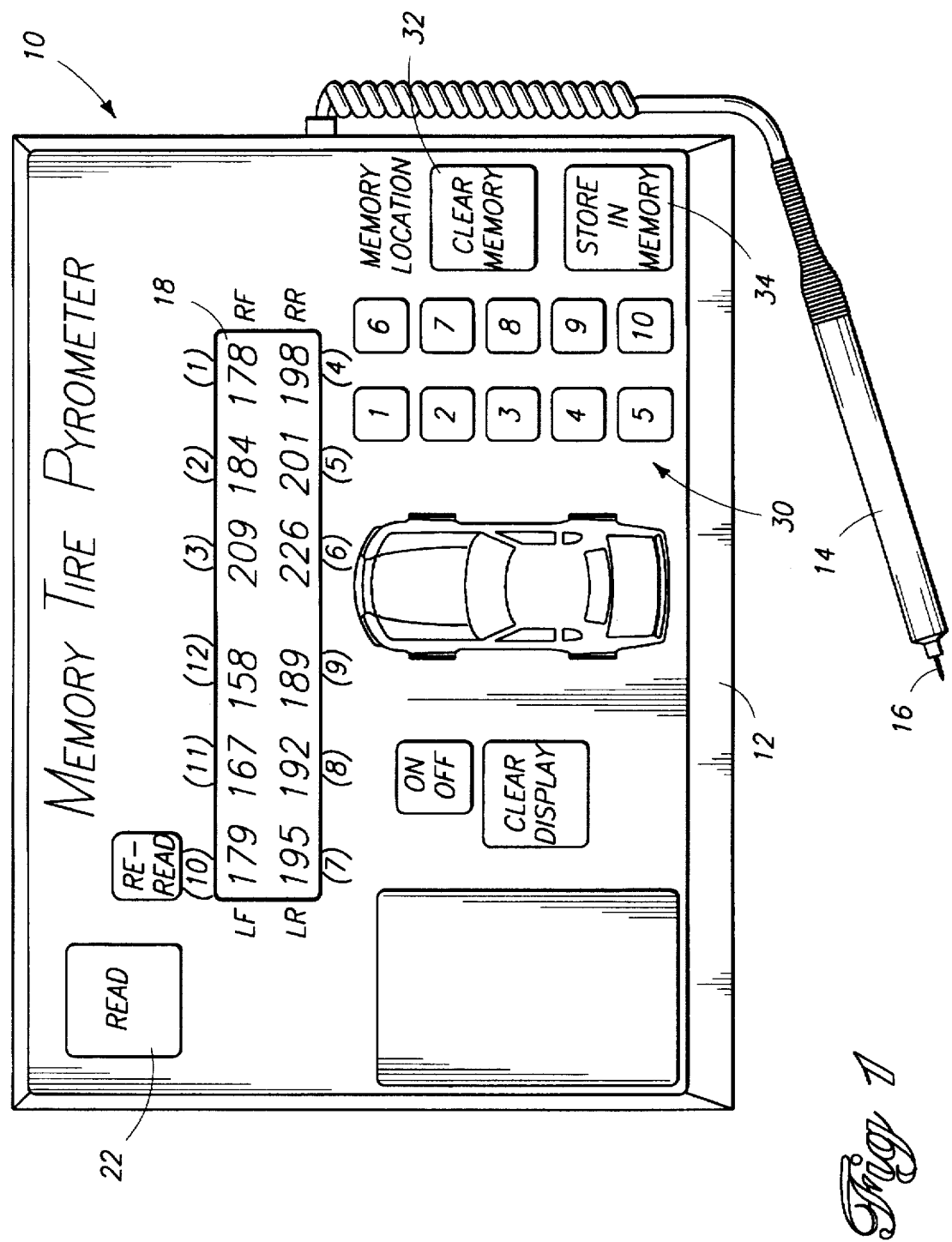
FIG. 1 is a pictorial view of the tire pyrometer of the present invention.

Referring to FIG. 1, the tire pyrometer 10 of the present invention includes a control box 12 and a tire probe 14. Tire probe 14 includes a needle element 16 for inserting into the tread of a race car's tire. Generally, tire probe 14 is a commercially-available item, well known in the art, and will not be discussed in detail herein. Control box 12 includes a main display panel 18 in which a variety of temperature readings are displayed. Display panel 18 is surrounded by a set of symbols identifying the race car's tires as "LF" for the left front tire, "LR" for the left rear tire, "RF" for the right front tire, and "RR" for the right rear tire. Across the top and bottom of display panel 18 is additional information that identifies the location on each tire LF, LR, RF, RR, where each temperature reading was taken. The information includes "outside," "center," and "inside" for each tire LF, LR, RF, RR. Thus, a total of twelve temperature readings are displayed in display panel 18. The top left three readings are for the left front tire, at its outside, center and inside locations.

With these temperature readings simultaneously displayed in display panel 18, a race technician can quickly determine how the race car's suspension is performing. How a race technician makes this determination from the temperature readings and subsequently adjusts or tunes a race car's suspension is well known in the art and will not be discussed herein.

Control box 12 is designed to function by first starting out with display panel 18 cleared of previous readings. A race technician then inserts the tire probe into the outside location of the right front tire. After a few seconds, a temperature reading is displayed in display panel 18 at the upper right hand portion of the display. The race technician then pushes the "Read" button to freeze or set the current reading on the display and to signal the circuitry of the control box 12 to move to the next temperature reading. The race technician then re-inserts the tire probe 14 into the center location of the right front tire and pushes the "Read" button as above. This freezes or sets that temperature just to the left of the first temperature. This procedure is repeated at the inside location of the right front tire and the technician again pushes the "Read" button. This temperature is frozen just to the left of the first two. At this point, the race technician has three temperature readings for the right front tire. The race technician then moves to the right rear tire and takes three readings, and follows this up by moving on to the left rear tire, taking three readings, and finally moving to the left front tire and getting three readings for that tire. At this point, twelve temperature readings are displayed. Control box 12 includes an on/off button 24 and a "clear display" button 26.

Control box 12 also includes a set of ten memory buttons 30. A race technician simply takes twelve temperature readings and presses a memory button at the same time as pressing a "store in memory" button 34, to store all twelve readings. Thus, a total of ten sets of temperature readings can be stored in memory and subsequently recalled, when necessary. Control box 12 also includes a "clear memory" button 32.

Referring to FIG. 2, the circuitry of control box 12 is also programmed to calculate average temperatures in a variety of different combinations. Example 1 of FIG. 2 shows that the average temperature for each corner tire LF, LR, RF, RR can be displayed. This simply involves averaging the three readings for each tire. As shown in Example 2, the front average temperature and the rear average temperature can be displayed. This involves averaging the six temperature readings for the front two tires and the six temperature readings for the rear two tires. Also, the average temperature differential is displayed. Means for calculating the average of a series of numbers and means for accessing an AVERAGE MODE function by depressing at least one of the plurality of buttons of the control box are well known in the art. Any such well known average calculating means and AVERAGE MODE function accessing means may be utilized in conjunction with the present invention, the nature of which will be known to a person of ordinary skill in the art.

As shown in Example 3, the left average temperature can be displayed by averaging the left front and left rear tire temperatures, and the right front and right rear temperatures. Also, the average differential between left and right is displayed. As shown in Example 4, two cross average temperatures can be displayed, one for the average temperature for the left rear and right front tires, and the other for the right rear and left front tires. Again, the differential is displayed.

Once in AVERAGING MODE, each of the different average temperature displays of Examples 1–4 can be accessed selectively by depressing memory buttons 1, 2, 3, or 4. Memory button 1 brings up the average temperatures for the four corner tires; memory button 2 brings up front and rear average temperatures; memory button 3 brings up left and right averages; and memory button 4 brings up cross averages.

Figure 3A:
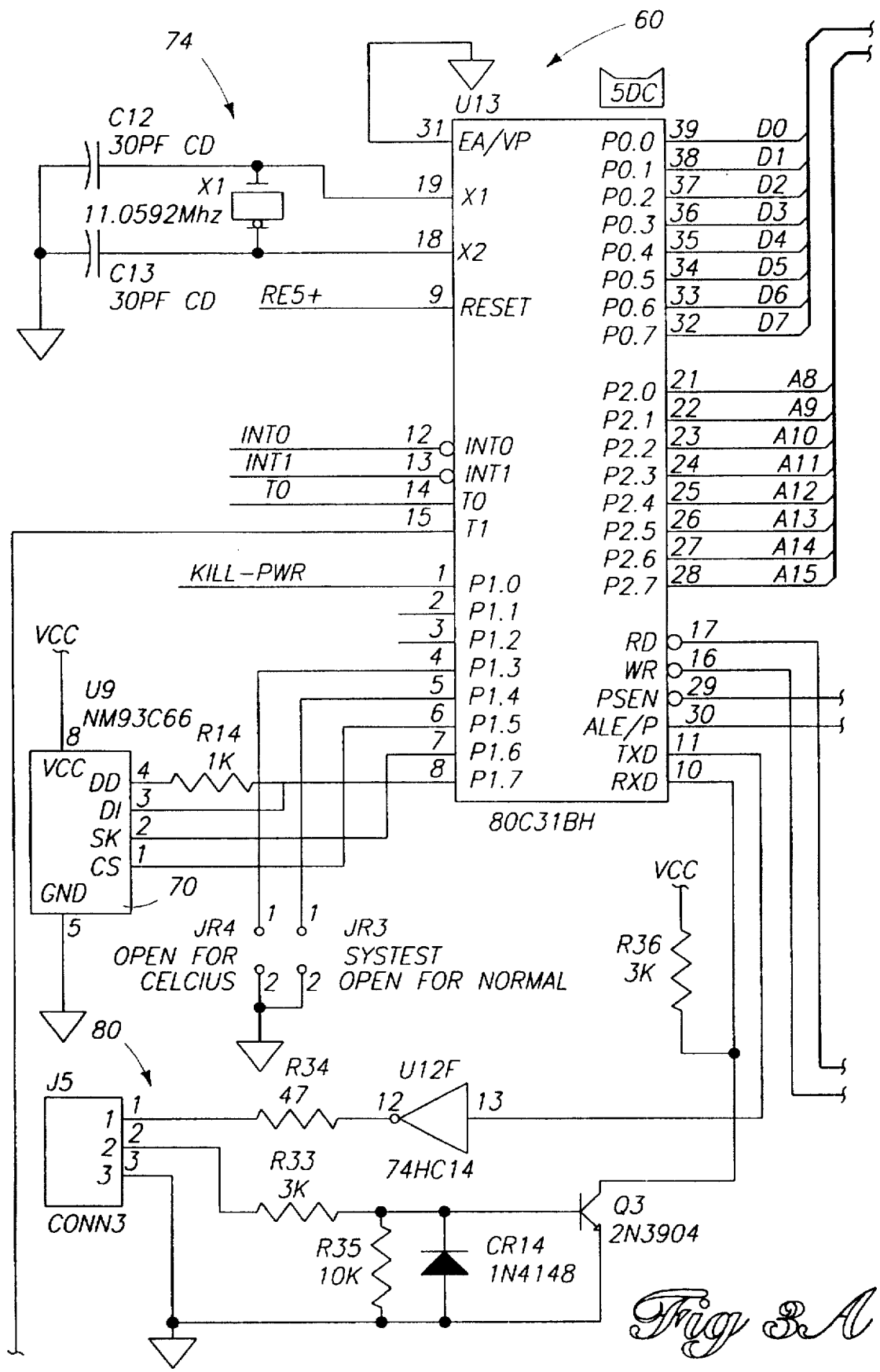
FIGS. 3–7 are a series of schematic circuit diagrams of the control box of FIG. 1.
Figure 3B:
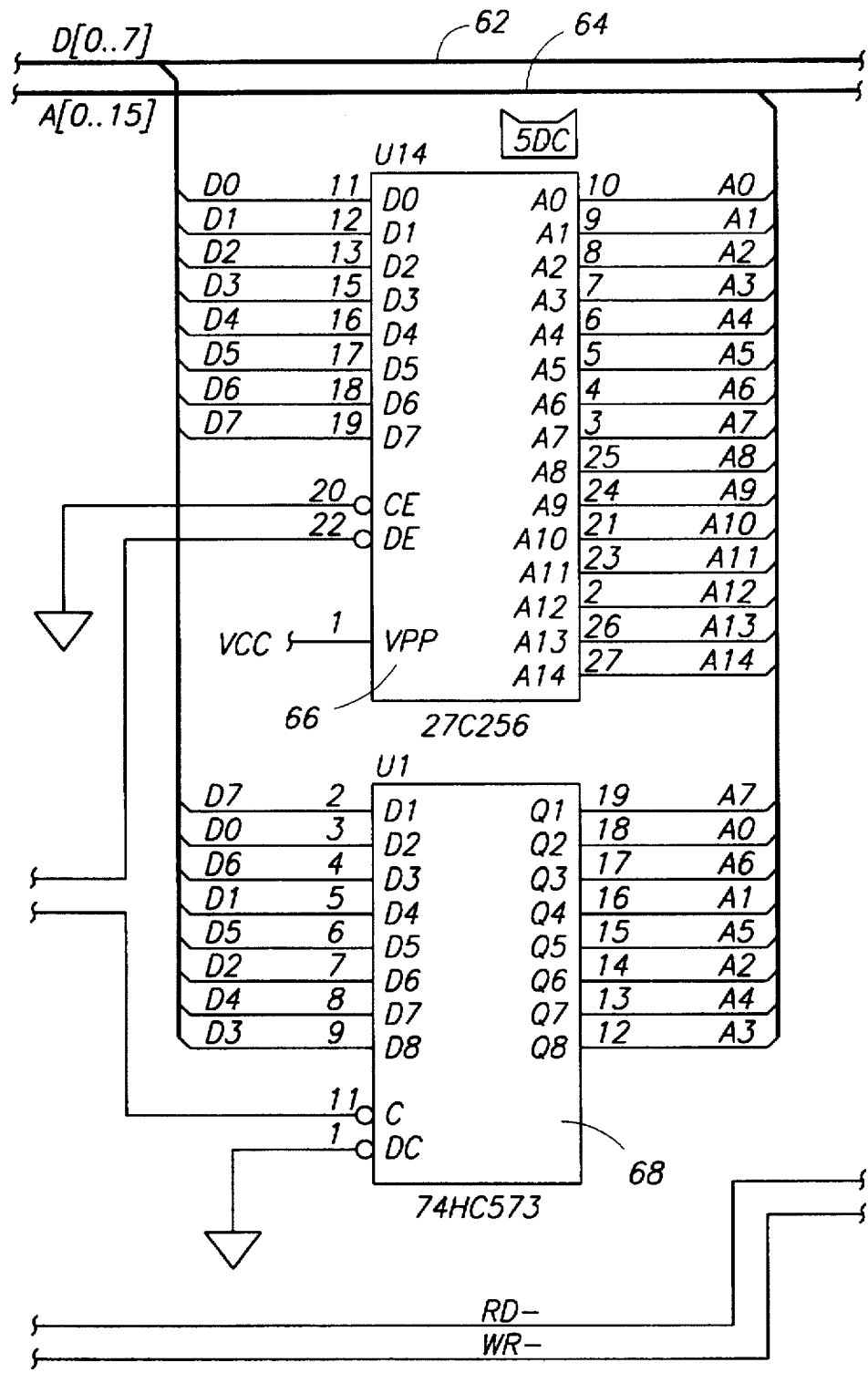
Figure 3C:
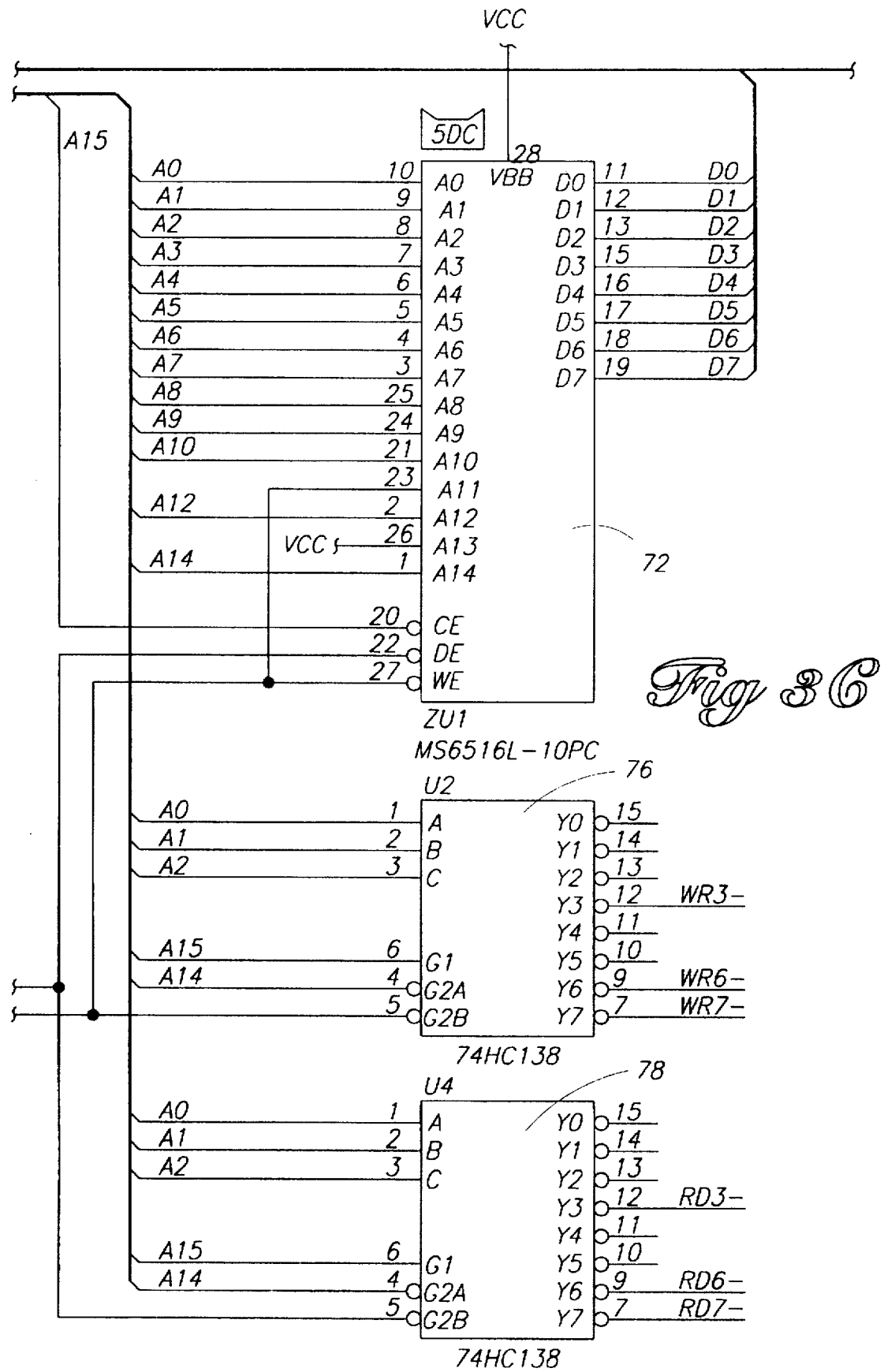

In FIG. 3, the electronic circuitry of control box 12 is shown to include an 80C31BH microprocessor 60 for controlling the various components of the circuitry. A data bus 62 and an address bus 64 provide for communication between microprocessor 60 and the various components discussed herein. An E-PROM 66, an address latch 68, an EEPROM 70, and an external ram 72 provide the various memory devices for the circuit. A clock 74 is connected with microprocessor 60.

Strobe decoders 76, 78 are interfaced between address bus 64 and the various components of the system and function to provide communication signals between microprocessor 60 and the other components. A serial interface 80 is also provided with the circuitry.

Figure 4A:
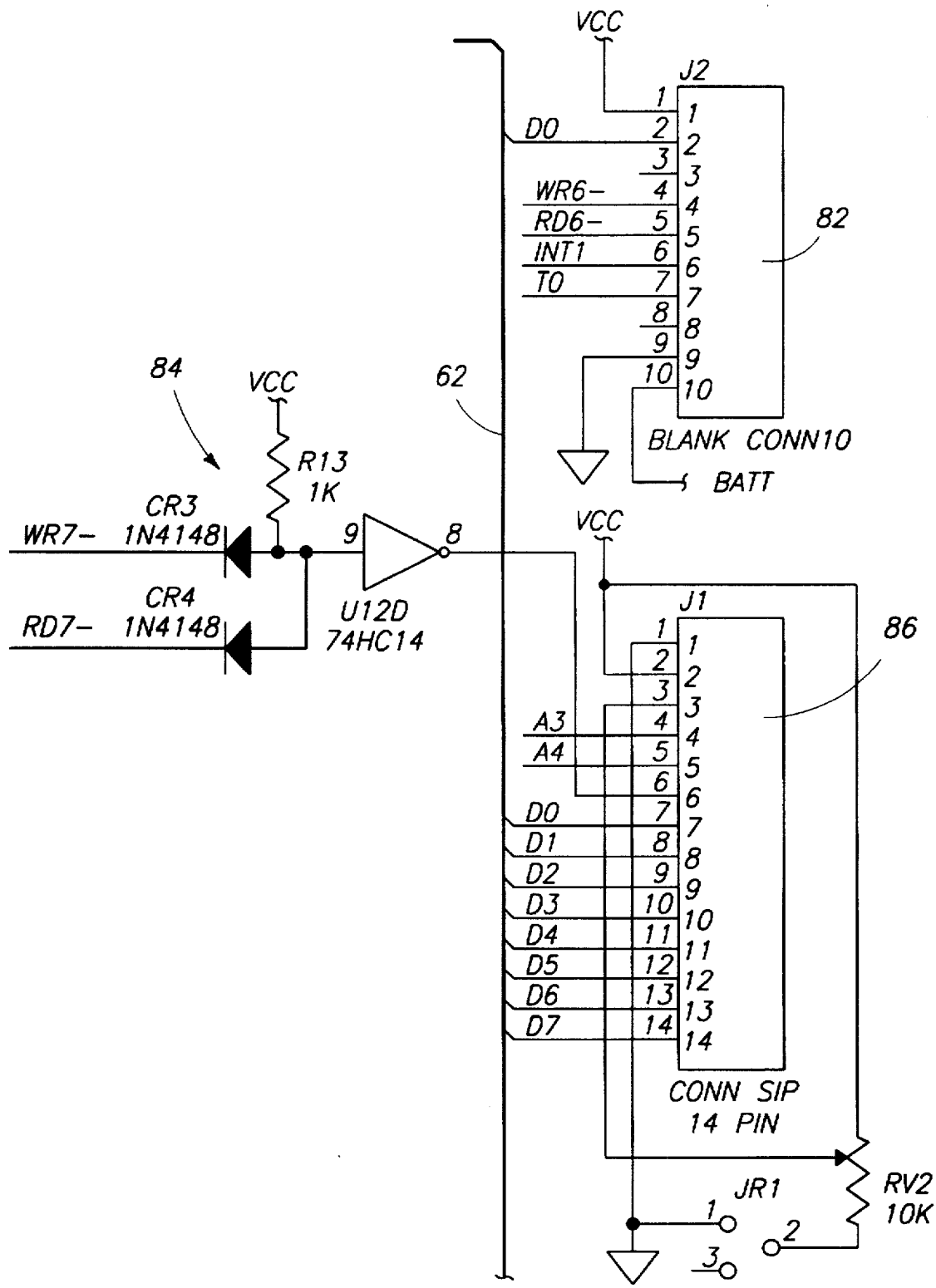
Figure 4B:
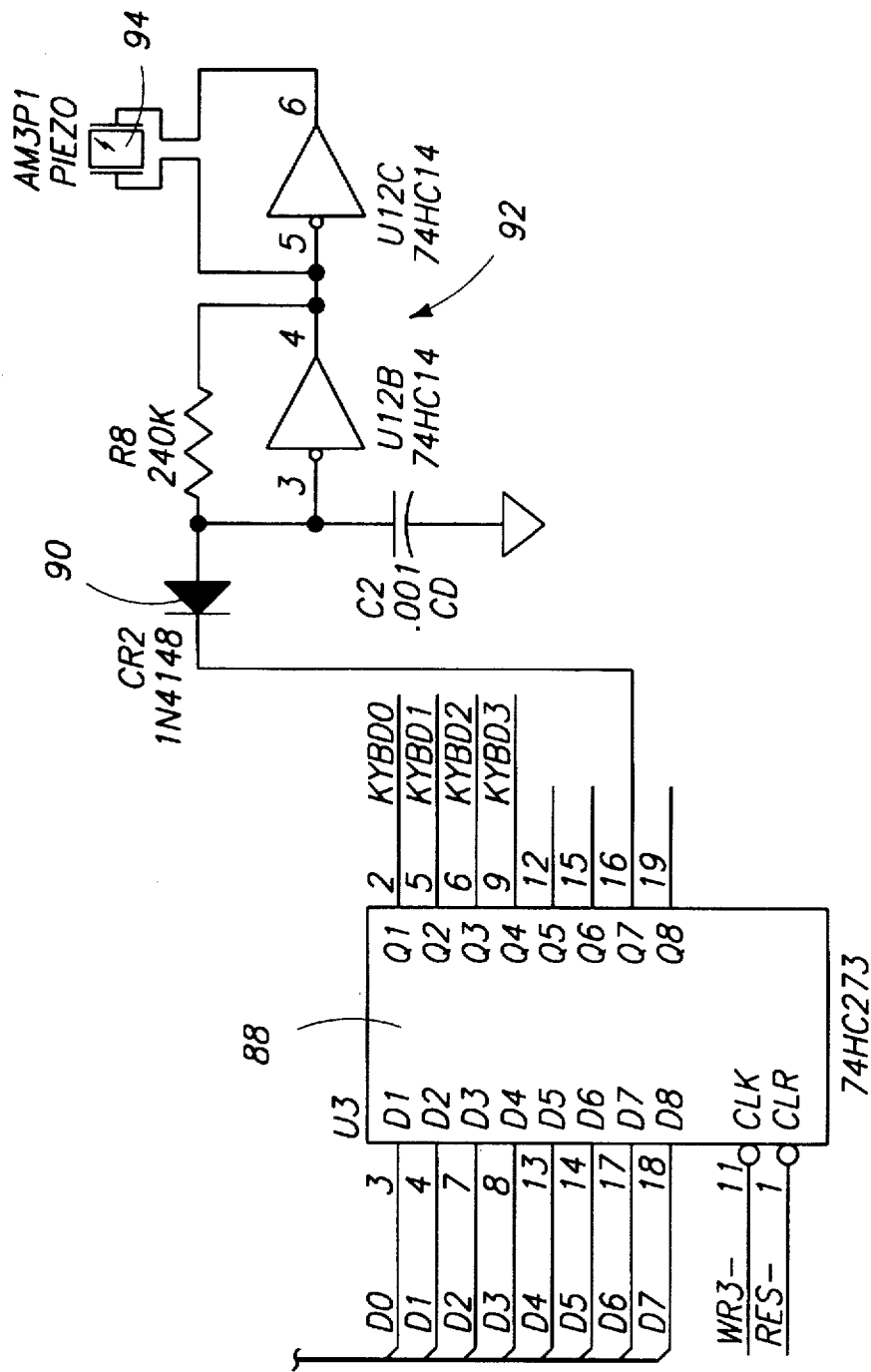

Referring to FIG. 4, data bus 62 provides communication with an option connector 82, logical "or" gates 84, a display connector 86, and a latch 88. Latch 88 communicates with a diode 90, oscillator 92, and piezo 94, which provide an audible signal at various times during operation of control box 12.

Figure 5A:
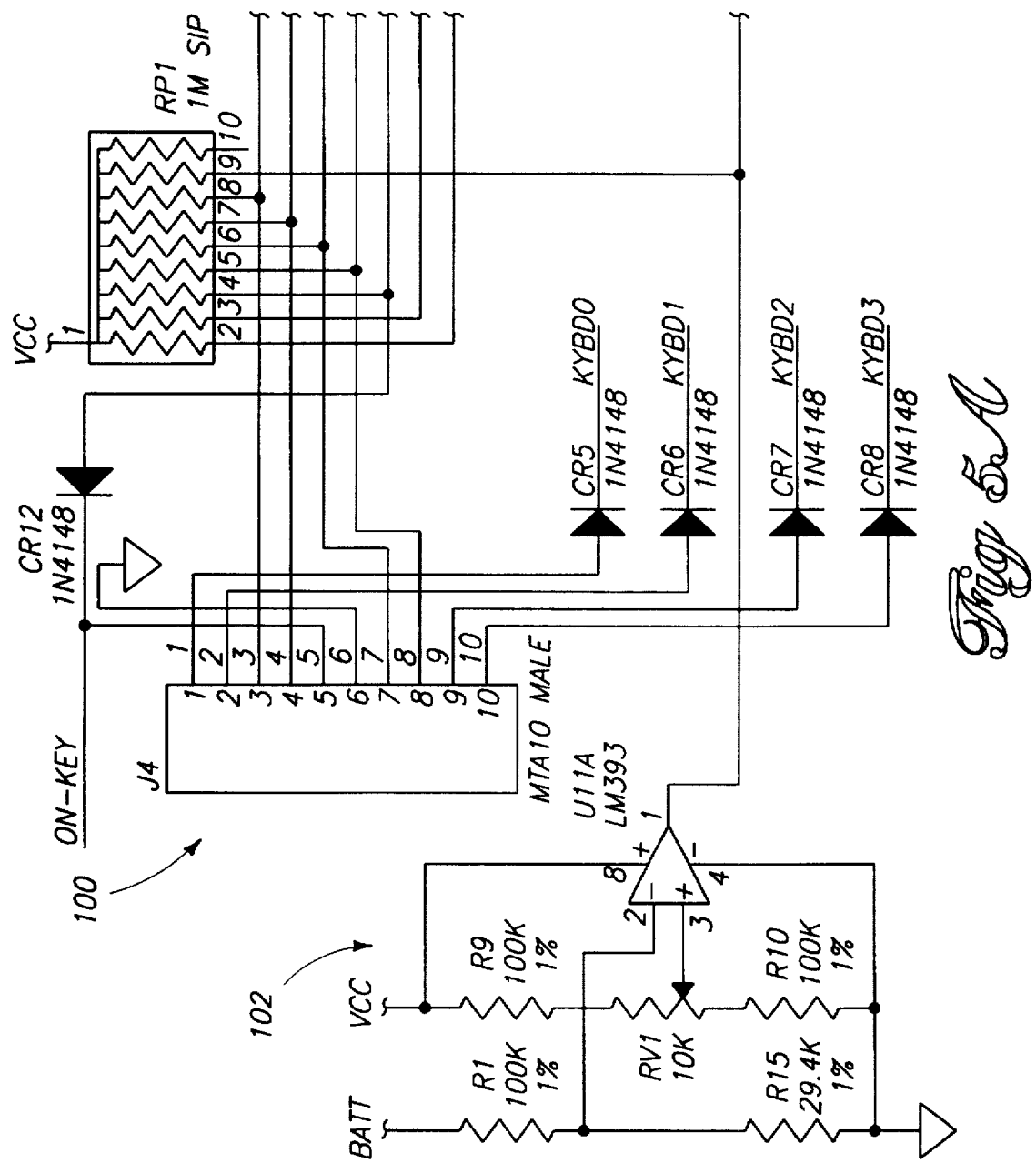

Referring to FIG. 5, a buffer 96 is between data bus 62 and a plurality of series resistors 98. A keyboard interface 100 communicates with the various buttons on control box 12. A low battery circuit 102 is provided to signal when the battery of control box 12 is getting low.

Figure 6:
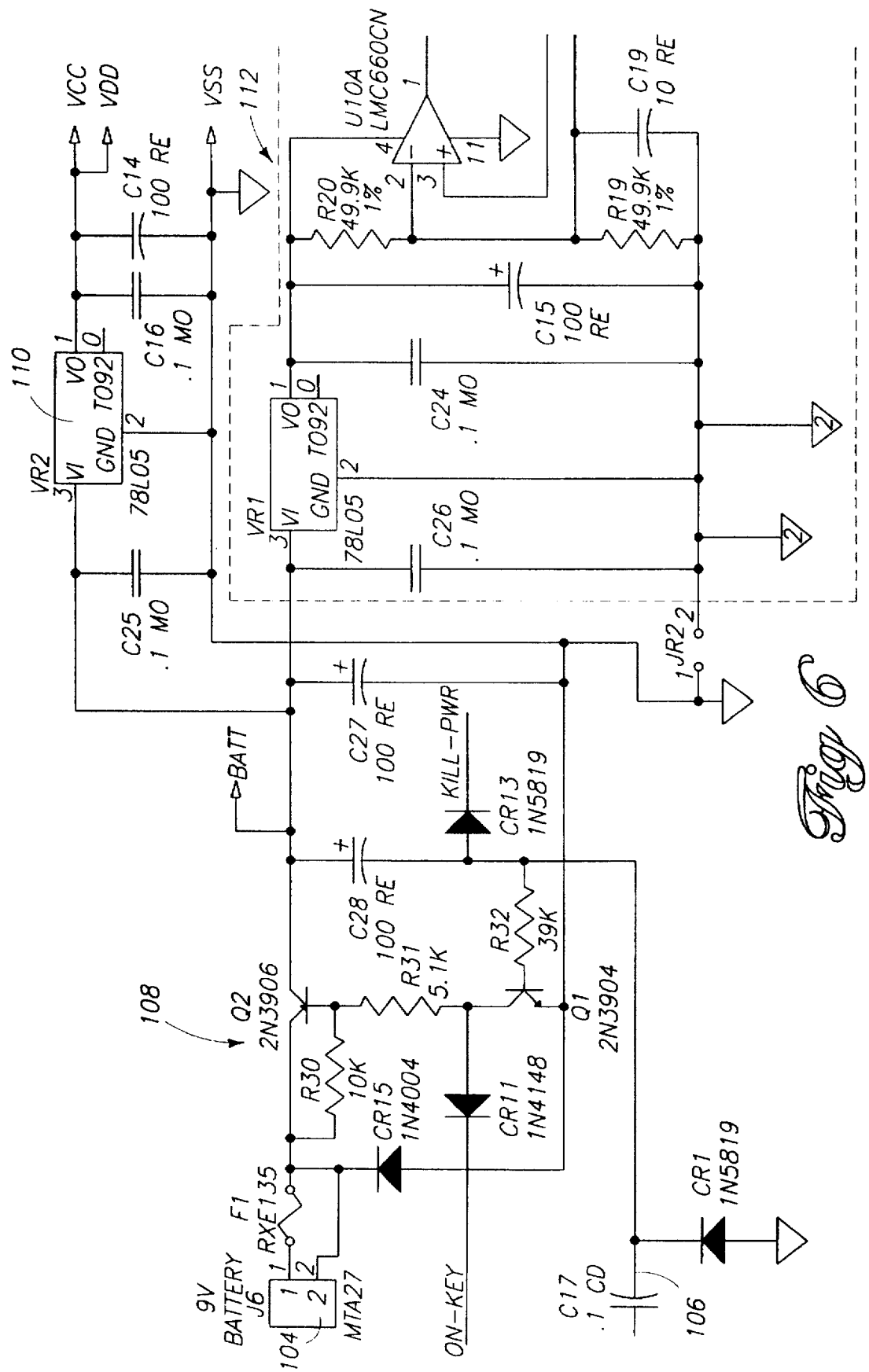

Referring to FIG. 6, a battery 104 provides the main power for the circuitry of control box 12. A toggle line 106 communicates between microprocessor 60 and the main power circuitry 108 to intermittently pulse the circuitry to keep the system turned on should inputs not be received from an operator over a predetermined period of time. Also, should microprocessor 60 fail, the termination of toggle pulses will cause the system to turn off.

A low forward dropout voltage regulator 110 is provided to maintain +5 volts to various points of the circuitry. The circuitry identified as "ground plane components" is an analog to digital convertor 112 comprised of a group of microchips.

Figure 7:
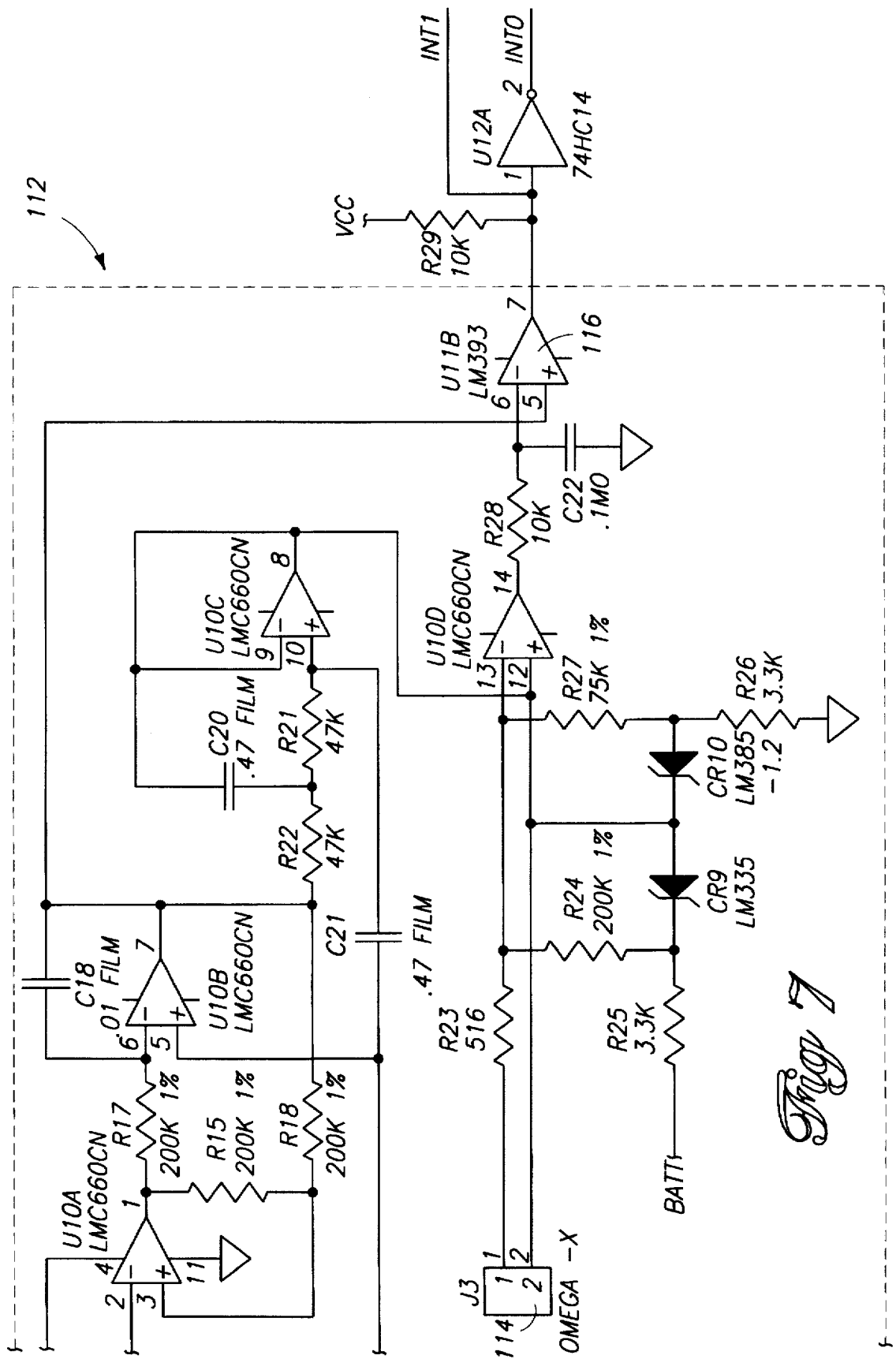

Referring to FIG. 7, A/D convertor 112 includes a thermocouple input 114 and a pulse width modulated output that is proportional to the temperature input received at 114.

The foregoing circuitry is similar to the circuitry for the control box of a weight scale invention that is the subject matter of my co-pending patent application Ser. No. 08/662,875, filed Jun. 12, 1996, and entitled, "System for Weighing a Vehicle." Application 662,875 is still pending. The foregoing-discussed circuit components will be understood by those skilled in the art.

While the display and associated circuitry has been described as being able to show twelve temperature readings together, more than twelve temperature readings could be shown, wherein each tire has associated with it an inside temperature reading, an outside temperature reading, and several center readings between the two.

These and other advantages and features will become apparent from the following detailed description of the best mode for carrying out the invention and the accompanying drawings, and the claims, which are incorporated herein as part of the disclosure of the invention.

What is claimed is:

1. A computerized pyrometer for measuring tire temperatures of a vehicle having four tires comprising:

a temperature probe used to measure an inside, center, and outside temperature of each of the four tires, and a control box including electronic circuitry that receives the temperature readings from the temperature probe and displays a numerical value representative of the temperature readings, the control box having a display panel that displays twelve temperature readings at the same time, the temperature readings corresponding to the inside temperature, center temperature, and outside temperature for each of the four tires.

2. The computerized pyrometer of claim 1, wherein the control box includes a plurality of memory buttons and electronic circuitry for storing in memory all the temperature readings simultaneously displayed on the display panel.

3. The computerized pyrometer of claim 1, wherein the control box includes a plurality of buttons and electronic circuitry for averaging various combinations of the temperature readings and displaying the combinations in the display panel.

4. The computerized pyrometer of claim 3, wherein such average combinations include left front average, right front average, left rear average, and right rear average.

5. The computerized pyrometer of claim 3, wherein such average combinations include front average and rear average.

6. The computerized pyrometer of claim 3, wherein such average combinations include left average and right average.

7. The computerized pyrometer of claim 3, wherein such average combination include cross averages for left rear, right front average and right rear, left front average.

8. A computerized pyrometer for measuring tire temperatures of a vehicle having four tires, comprising:

control box including electronic circuitry that receives temperature readings of the inside, center and outside temperatures of each of the four tires measured using a temperature probe and displays a numerical value representative of the temperature readings, the control box having a display panel that displays twelve temperature readings at the same time, the temperature readings corresponding to the inside temperature, center temperature, and outside temperature for each of the four tires.

9. The computerized pyrometer of claim 8, wherein the control box includes a plurality of memory buttons and electronic circuitry for storing in memory all the temperature readings simultaneously displayed on the display panel.

10. The computerized pyrometer of claim 8, wherein the control box includes a plurality of buttons and electronic circuitry for averaging various combinations of the temperature readings and displaying the combinations in the display panel.

11. The computerized pyrometer of claim 10, wherein such average combinations include left front average, right front average, left rear average, and right rear average.

12. The computerized pyrometer of claim 10, wherein such average combinations include front average and rear average.

13. The computerized pyrometer of claim 10, wherein such average combinations include left average and right average.

14. The computerized pyrometer of claim 10, wherein such average combination include cross averages for left rear, right front average and right rear, left front average.

* * * * *